US012798358B2

(12) United States Patent
Konrad et al.

(10) Patent No.: US 12,798,358 B2
(45) Date of Patent: Nov. 17, 2026

(54) TEMPERATURE CONTROL CIRCUIT FOR AN ELECTRIC MOTORCYCLE, AND ELECTRIC MOTORCYCLE

(71) Applicant: Bayerische Motoren Werke Aktiengesellschaft, Munich (DE)

(72) Inventors: Jan Konrad, Berlin (DE); Daniel Reinhardt-Probul, Grafing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 145 days.

(21) Appl. No.: 18/294,734

(22) PCT Filed: Jul. 28, 2022

(86) PCT No.: PCT/EP2022/071229
§ 371 (c)(1),
(2) Date: Feb. 2, 2024

(87) PCT Pub. No.: WO2023/016822
PCT Pub. Date: Feb. 16, 2023

(65) Prior Publication Data

US 2025/0100371 A1 Mar. 27, 2025

(30) Foreign Application Priority Data

Aug. 11, 2021 (DE) ..................... 10 2021 120 855.6

(51) Int. Cl.
*B60K 11/02* (2006.01)
*B60K 1/00* (2006.01)

(52) U.S. Cl.
CPC ........ *B60K 11/02* (2013.01); *B60K 2001/005* (2013.01); *B60K 2001/006* (2013.01); *B60K 2001/008* (2013.01); *B60Y 2200/12* (2013.01)

(58) Field of Classification Search
CPC ........ B60K 2001/008; B60K 2001/006; B60K 2001/005; B60K 11/02
See application file for complete search history.

(56) References Cited

U.S. PATENT DOCUMENTS 9,878,594 B2 * 1/2018 Enomoto ............... B60K 11/02
10,183,548 B2 * 1/2019 Enomoto ........... B60H 1/00485
(Continued)

FOREIGN PATENT DOCUMENTS

DE 10 2015 122 196 A1 6/2017
DE 10 2019 132 816 A1 6/2021
WO WO 2021/009318 A1 1/2021

OTHER PUBLICATIONS

International Search Report (PCT/ISA/210) issued in PCT Application No. PCT/EP2022/071229 dated Nov. 25, 2022 with English translation (4 pages).

(Continued)

*Primary Examiner* — Devon Lane
(74) *Attorney, Agent, or Firm* — Crowell & Moring LLP

(57) ABSTRACT

A temperature control circuit for an electric motorcycle includes an engine cooling circuit, which has an electric drive motor and an ambient air engine cooler, a storage cooling circuit, which has a traction battery and an ambient air tank cooler, and a valve device configured to switch between a cooling mode, in which the engine cooling circuit and the storage cooling circuit are connected to one another to allow, independently of one another, a through-flow without an exchange of temperature control fluid, and a heating mode, in which the engine cooling circuit and the storage cooling circuit are connected to one another, so that a temperature control circuit is formed, in which a flow can pass through the electric drive motor and the traction battery, bypassing the ambient air engine cooler and the ambient air tank cooler.

6 Claims, 1 Drawing Sheet

(56) References Cited

U.S. PATENT DOCUMENTS

| | | | | |
|---|---|---|---|---|
| 2011/0296855 | A1* | 12/2011 | Johnston | B60L 50/40 62/160 |
| 2012/0225341 | A1* | 9/2012 | Major | B60L 3/003 429/120 |
| 2016/0318370 | A1* | 11/2016 | Rawlinson | B60H 1/32281 |
| 2018/0178615 | A1 | 6/2018 | Xia et al. | |
| 2021/0143467 | A1* | 5/2021 | Wang | H01M 10/0525 |
| 2022/0115930 | A1* | 4/2022 | Choi | H02K 9/20 |
| 2022/0274458 | A1* | 9/2022 | Eser | B60K 11/04 |

OTHER PUBLICATIONS

German-language Written Opinion (PCT/ISA/237) issued in PCT Application No. PCT/EP2022/071229 dated Nov. 25, 2022 with English translation (9 pages).

German Search Report issued in German Application No. 10 2021 120 855.6 dated Jul. 27, 2022 with partial English translation (13 pages).

* cited by examiner

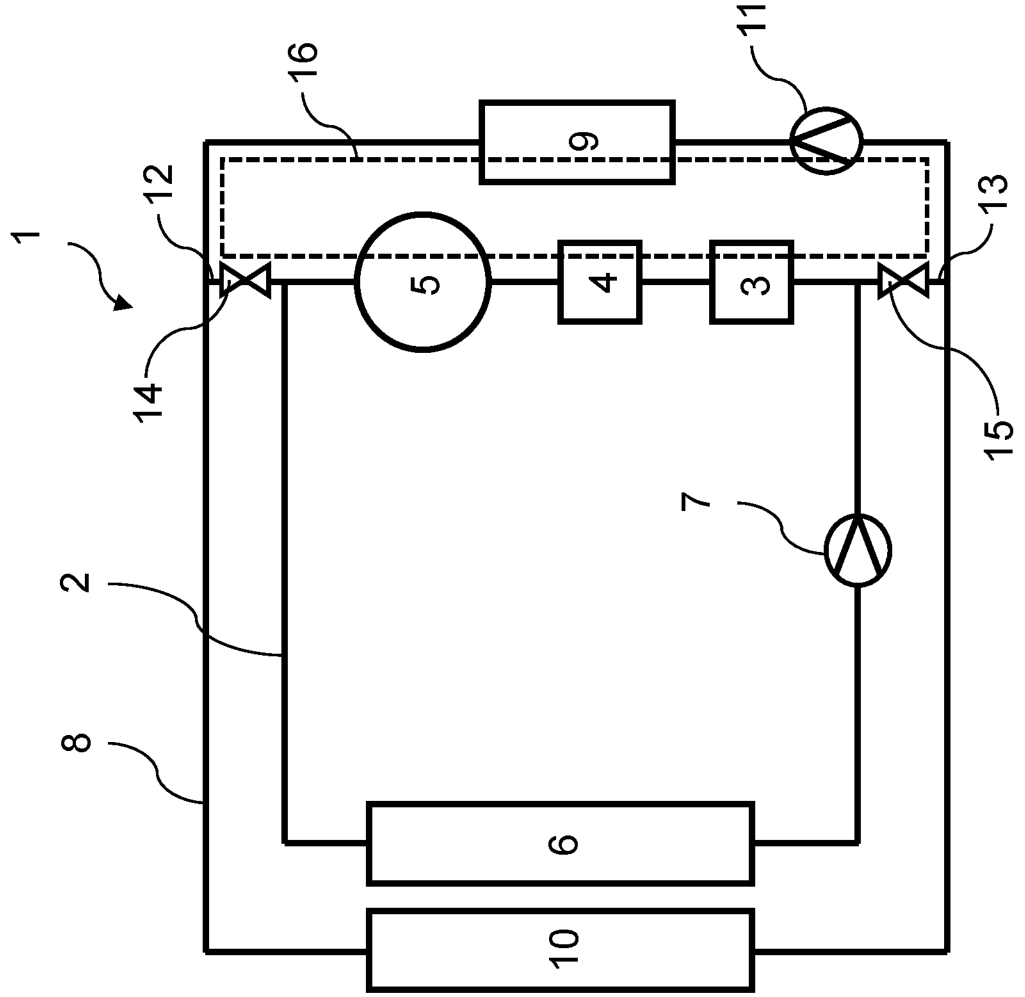
1
2
3
4
5
6
7
8
9
10
11
12
13
14
15
16

TEMPERATURE CONTROL CIRCUIT FOR AN ELECTRIC MOTORCYCLE, AND ELECTRIC MOTORCYCLE

BACKGROUND AND SUMMARY

The invention relates to a temperature control circuit having a drive electric motor and a traction battery for an electric motorcycle. In addition, the invention relates to an electric motorcycle having such a temperature control circuit.

Electric motorcycles are known, the traction battery of which is either passively cooled, i.e., waste heat of the traction battery is transported away by the ambient air, or is cooled by a water cooling system. The possibilities for cooling the traction battery are significantly more restricted in an electric motorcycle than in an automobile, since much less installation space is available in the motorcycle and the air conditioning circuit, which is generally present in any case for climate control purposes in automobiles, is absent. Traction battery cooling circuits for automobiles are insofar only rarely transferable for use in electric motorcycles.

It is therefore an object of the present invention to provide improved temperature control of drive components for an electric motorcycle. This object is achieved by a temperature control circuit, an electric motorcycle, and a method according to the present disclosure. Advantageous refinements of the invention are also the subject matter of the present disclosure.

According to one exemplary embodiment of the invention, a temperature control circuit for an electric motorcycle is provided, having a motor cooling circuit, which includes a drive electric motor and a motor ambient air cooler; a storage cooling circuit, which includes a traction battery and a storage ambient air cooler, a valve device for switching between a cooling mode in which the motor cooling circuit and the storage cooling circuit are interconnected to have flow through them independently of one another without temperature control fluid exchange with one another, and a heating mode in which the motor cooling circuit and the storage cooling circuit are connected to one another, so that a temperature control circuit is formed, in which the drive electric motor and the traction battery can have flow through them, while bypassing the motor ambient air cooler and the storage ambient air cooler. This temperature control circuit has the advantage that at cold ambient temperatures, the waste heat from the motor cooling circuit can be used to heat the traction battery. The optimum operating range of the traction battery is thus reached faster, which has a positive effect on the performance and service life of the battery. During the journey, for example, waste heat from the drive electric motor or a drive electronics unit can be used. In addition, due to the possibility of operating the motor cooling circuit and the storage cooling circuit independently of one another, it is possible to prevent further heating of the traction battery in warmer ambient conditions, which do not require heating of the traction battery.

According to a further exemplary embodiment, a first pump is arranged in the motor cooling circuit and a second pump is arranged in the storage circuit. A flow through the motor cooling circuit and the storage cooling circuit can thus be controlled independently of one another.

According to a further exemplary embodiment of the invention, the first or second pump is also arranged in the temperature control circuit. That is to say, only one pump of the two pumps is arranged in the temperature control circuit. One of the two pumps is thus used as a conveyor for controlling the through-flow for two circuits.

According to a further exemplary embodiment of the invention, the motor cooling circuit and the storage cooling circuit are connectable to one another via two connecting lines and a valve, which forms the valve device, is arranged in one or both connecting lines. The valve(s) can be a shutoff valve, which releases, blocks, or partially releases a through-flow, or a proportional valve.

According to a further exemplary embodiment of the invention, the temperature control circuit furthermore includes a motorcycle-internal charging device, which is arranged both in the motor cooling circuit and in the temperature control circuit. This has the advantage that waste heat of the motorcycle-internal charging device can be used for heating the traction battery even when the motorcycle is stationary.

In addition, the present invention provides an electric motorcycle having such a temperature control circuit.

In addition, the invention provides a method for operating such a temperature control circuit, wherein when stationary, the drive electric motor is activated in such a way that it generates waste heat and this waste heat is transported to the traction battery by the temperature control circuit.

A preferred exemplary embodiment of the present invention is described hereinafter with reference to the appended drawing.

BRIEF DESCRIPTION OF THE DRAWINGS

FIG. 1 schematically shows a temperature control circuit according to an exemplary embodiment of the present disclosure.

DETAILED DESCRIPTION OF THE DRAWINGS

This temperature control circuit is integrated in an electric motorcycle, i.e., a motorcycle which is solely electrically driven at least sometimes. The electric motorcycle is, for example, an electrically driven motorcycle or a motor scooter.

The temperature control circuit 1 comprises a motor cooling circuit 2, in which a motorcycle-internal charging device 3, a drive electronics unit 4, a drive electric motor 5, a motor ambient cooler 6, and a first pump 7 are arranged. These mentioned components are arranged in series, so that temperature control fluid can be circulated through these components in the form of a closed circuit.

The temperature control fluid is, for example, a typical coolant, in particular water admixed with additives.

The drive electric motor 5 is formed by one or more electric motor(s) for driving the motorcycle. The drive electronics unit 4 comprises, for example, diverse power electronics components.

In addition, the temperature control circuit 1 includes a storage cooling circuit 8, which includes a traction battery 9, a storage ambient air cooler 10, and a second pump 11. These mentioned components are arranged in series, so that temperature control fluid can be circulated through these components in the form of a closed circuit.

The motor cooling circuit 2 and the storage cooling circuit 8 are optionally connectable to one another via a first connecting line 12 and a second connecting line 13. For this purpose, a valve 14, 15 is provided in at least the connecting line 12 or the connecting line 13. In particular, a valve 14, 15 is provided in each connecting line 12, 13. With closed valve(s) 14, 15, the motor cooling circuit 2 and the storage cooling circuit 8 can be operated independently of one another in a cooling mode, without a temperature control fluid exchange taking place between them. Temperature control fluid is circulated in the motor cooling circuit 2 when the first pump 7 is activated, so that waste heat of the motorcycle-internal charging device 3, the drive electronics unit 4, and/or the drive electric motor 5 is dissipated via the motor ambient air cooler 6. Temperature control fluid is circulated in the storage cooling circuit 8 when the second pump 11 is activated, so that waste heat of the traction battery 9 is dissipated via the storage ambient air cooler 10.

The first connecting line 12 in particular connects a point of the motor cooling circuit 2 downstream of the drive electric motor 5 and upstream of the motor ambient air cooler 6 to a point of the storage cooling circuit 8 downstream of the traction battery 9 and upstream of the storage ambient air cooler 10.

The second connecting line 13 in particular connects a point of the motor cooling circuit 2 downstream of the first pump 7 and upstream of the drive electric motor 5, in particular also upstream of the charging device 3 and the drive electronics unit 4, to a point of the storage cooling circuit 8 downstream of the storage ambient air cooler 10 and upstream of the second pump 11.

With open valves 14 and 15, deactivated first pump 7, and activated second pump 11, a temperature control circuit 16 is formed which is shown by a dashed line in FIG. 1. This enables a heating mode for heating the traction battery 9. Temperature control fluid flows through the drive electric motor 5, the drive electronics unit 4, the charging device 3, and the traction battery 9 in series along the temperature control circuit 16, so that waste heat of the drive electric motor 5, the drive electronics unit 4, and/or the charging device 3 is introduced into the traction battery 9 in order to heat the traction battery.

The heating typically takes place during the journey by way of the drive electric motor 5 and the drive electronics unit 4 and when stationary by way of the charging device 3. However, it can also be provided, for example, that by suitable activation of the drive electric motor 5, waste heat is generated when stationary by the drive electric motor 5, without generating mechanical drive power.

As a modification of the above-described exemplary embodiment, for example, the connecting line 13 could also be arranged so that it connects a point of the motor cooling circuit 2 downstream of the motor ambient air cooler 6 and upstream of the first pump 7 to a point of the storage cooling circuit 8 downstream of the second pump 11 and upstream of the traction battery 9. The second pump 11 would thus then not be the conveyor of the temperature control circuit 16, but rather the first pump 7.

While the invention was illustrated and described in detail in the drawings and the preceding description, this illustration and description are to be understood as exemplary and not as restrictive and it is not intended that the invention be restricted to the disclosed exemplary embodiment. The mere fact that certain features are mentioned in different dependent claims is not to indicate that a combination of these features could not also advantageously be used.

What is claimed is:

1. A temperature control circuit for an electric motorcycle, comprising:

a motor cooling circuit including a drive electric motor and a motor ambient air cooler;

a storage cooling circuit including a traction battery and a storage ambient air cooler;

a valve device configured to switch between a cooling mode and a heating mode;

a first pump arranged in the motor cooling circuit; and a second pump arranged in the storage cooling circuit, wherein, when in the cooling mode, the motor cooling circuit and the storage cooling circuit are disconnected from one another to have flow through them independently of one another without temperature fluid exchange with one another, wherein, when in the heating mode, the motor cooling circuit and the storage cooling circuit are connected to one another so that a combined temperature control circuit forms, in which the drive electric motor and the traction battery have flow through them, while bypassing the motor ambient air cooler and the storage ambient air cooler, wherein the motor cooling circuit and the storage cooling circuit are configured to connect to one another via a first connecting line and a second connecting line, wherein the valve device comprises a first valve and a second valve, and wherein the first valve is arranged in the first connecting line, and where the second valve is arranged in the second connecting line, and wherein one of the first pump or the second pump is also arranged in the combined temperature control circuit, and wherein another of the first pump or the second pump is excluded from the combined temperature control circuit.

2. The temperature control circuit according to claim 1, comprising:

a motorcycle-internal charging device arranged both in the motor cooling circuit and in the combined temperature control circuit.

3. An electric motorcycle comprising:

the temperature control circuit according to claim 1.

4. A method for operating a temperature control circuit, wherein the temperature control circuit comprises a motor cooling circuit including a first pump, a drive electric motor, and a motor ambient air cooler, a storage cooling circuit including a second pump, a traction battery, and a storage ambient air cooler, and a valve device configured to switch between a cooling mode and a heating mode, wherein, when in the cooling mode, the motor cooling circuit and the storage cooling circuit are disconnected to have flow through them independently of one another without temperature fluid exchange with one another, and wherein, when in the heating mode, the motor cooling circuit and the storage cooling circuit are connected to one another so that a combined temperature control circuit forms, in which the drive electric motor and the traction battery have flow through them, while bypassing the motor ambient air cooler and the storage ambient air cooler, wherein one of the first pump or the second pump is also arranged in the combined temperature control circuit, and wherein another of the first pump or the second pump is excluded from the combined temperature control circuit, the method comprising:

activating the drive electric motor, when stationary, such that it generates waste heat; and transporting the waste heat by the temperature control circuit to the traction battery.

5. A method for operating a temperature control circuit, comprising:

controlling a valve device to operate in a cooling mode, wherein a motor cooling circuit and a storage cooling circuit are disconnected to have flow through them independently of one another without temperature fluid exchange with one another, wherein the motor cooling circuit includes a first pump, a drive electric motor, and a motor ambient air cooler, and the storage cooling circuit includes a second pump, a traction battery, and a storage ambient air cooler;

controlling a valve device to operate in a heating mode, wherein, the motor cooling circuit and the storage cooling circuit are connected to one another so that a combined temperature control circuit forms, in which the drive electric motor and the traction battery have flow through them, while bypassing the motor ambient air cooler and the storage ambient air cooler, wherein one of the first pump or the second pump is arranged in the combined temperature control circuit, and wherein another of the first pump for the second pump is excluded from the combined temperature control circuit; and controlling the first pump and the second pump so that they are both active in response to being operated in the cooling mode, and controlling the other of the first pump or the second pump that is excluded from the combined temperature control circuit to be deactivated in response to being operated in the heating mode.

6. The method according to claim 5, comprising:

connecting the motor cooling circuit and the storage cooling circuit to one another via two connecting lines, wherein a valve that forms the valve device is arranged in one or both of the two connecting lines.

* * * * *